Oct. 3, 1961 J. F. THOMAS 3,003,049
SOLDERING IRONS
Filed Jan. 14, 1960 2 Sheets-Sheet 1

JOHN F. THOMAS
INVENTOR.

BY Donald M. Sandler
ATTORNEY

Oct. 3, 1961  J. F. THOMAS  3,003,049
SOLDERING IRONS

Filed Jan. 14, 1960  2 Sheets-Sheet 2

JOHN F. THOMAS
*INVENTOR.*

BY Donald M Sandler
*ATTORNEY*

United States Patent Office 3,003,049
Patented Oct. 3, 1961

3,003,049
SOLDERING IRONS
John F. Thomas, 804 Cedarcroft Road, Baltimore, Md.
Filed Jan. 14, 1960, Ser. No. 2,518
17 Claims. (Cl. 219—27)

This invention relates to magazine fed soldering irons, and more particularly to working tips for such soldering irons.

In soldering irons of the class described, it is conventional to feed solid solder from a magazine into the orifice of a working tip wherein the solder is melted. Further feeding of solid solder forces molten solder in the orifice out upon the pieces to be soldered while replenishing the supply of molten solder in the tip. One of the difficulties encountered with soldering irons of the class described is the retention of molten solder in the orifice when the working end of the tip is downwardly directed. That is, under the influence of gravity, molten solder in the orifice simply runs out. This difficulty can be alleviated somewhat by inserting in the orifice of the tip, a woven material which is not wetted by solder. The surface tension of the molten solder in the interstices of the material can thus provide a force which will support the column of molten solder against the force thereon due to gravity. However, this solution requires the insertion of a special woven element into the tip and thus adds to the complexity and cost of a magazine fed soldering iron.

Much effort has been expended by those skilled in the art to provide a soldering iron of the class described wherein the provision of an extra woven element in the orifice of the tip is not necessary to prevent molten solder therein from running out when the working end of the tip is downwardly directed. It is therefore an object of this invention to provide a tip for a soldering iron of the class described wherein a column of molten solder is supported against the force due to gravity without obstructing the orifice in the tip.

A further difficulty with soldering irons of the class described can be better appreciated by considering the fact that heat from the tip is conducted through the molten solder to the still solid solder in the magazine. Obviously, where the iron is in constant use over a period of time, the heat so conducted will melt the solder in the magazine unless an operator periodically shuts off the iron. However, such a haphazard control is highly undesirable, particularly when the iron is being used in production work.

Much effort has been expended by those skilled in the art to provide a soldering iron of the class described which does not have to be shut off in order to prevent heat from the molten solder from melting the solder in the magazine, but so far as is known, the problems described above remain unsolved. It is therefore a further object of this invention to provide a soldering iron of the class described in which neither heat from the tip nor heat from the molten solder can cause melting solid solder in the magazine.

Those skilled in the art recognize that molten solder on passing over a tip will erode the latter. In soldering irons of the class described wherein the tip is provided with an orifice, it is believed apparent that after an extended period of use, the orifice will become enlarged. Thus, if it is necessary to maintain the orifice constant, the tip would have to be replaced after a period of prolonged use. Much effort has been expended by those skilled in the art to provide a tip whose orifice does not become enlarged after prolonged use, but so far as is known, the problem remains unsolved. It is therefore a still further object of this invention to provide a tip for a soldering iron of the class described in which constant use does not change the orifice size.

As a feature of this invention whereby the objects thereof are achieved, the surface of the tip defining the orifice therein is made so as to be wetted by molten solder, and the transverse cross-section of the orifice is adjusted until a column of molten solder of any desired height can be maintained against the force thereon due to gravity by capillary action. To operate properly, it is necessary to insure that the transverse cross-section of the orifice remain constant at all times during use of the tip, since enlargement of cross-section results in a decrease in the height of a column of solder able to be maintained. Therefore, as another feature of this invention, the tip may be made separable with the desired spacing being determined by a means which is not eroded by molten solder. The separable parts of the tip are resiliently urged toward each other so that erosion of the tip has no effect on the desired spacing.

As a feature of this invention whereby heat from the tip and from the molten solder are prevented from melting solid solder in the magazine of the soldering iron, a resilient element which has a low heat transfer coefficient, and which is not wetted by molten solder is placed between the tip and the magazine. The solid solder is stiff enough to push the element out of its path and gain an entrance to the orifice in the tip. However, the element will resiliently close when the solder therein melts. This has the desired effect of thermally insulating the solid solder from the molten solder.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

Figure 1:
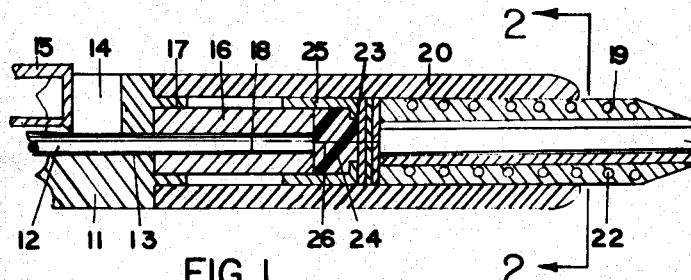
FIGURE 1 is a sectional view of a magazine fed soldering iron showing a thermal cut-off device and a capillary tip.

Referring now to FIGURE 1, a magazine fed soldering iron made in accordance with the invention is designated generally at 10. Iron 10 has handle 11 containing a magazine (not shown) for solid solder 12 which is fed through orifice 13. Feeder 15, slideably mounted in slot 14, is actuatable by the finger of an operator to force solid solder 12 through orifice 13 into cylindrical body 16 which is mounted in handle 11 in recess 17. Body 16 has orifice 18 aligned with orifice 13 for forming a passage through which solid solder is fed to tip 19. Cover 20 surrounds body 16 and connects tip 19 to handle 11. Tip 19 has orifice 21 which is aligned with orifice 18 in body 16. In this manner, selective actuation of feeder 15 causes solid solder to be drawn from the magazine and fed into the tip. Tip 20 is also provided with resistance heating elements 22 which helically surround orifice 21 and provide a source of heat serving to keep the tip at a working temperature at which solder in orifice 21 is maintained in a molten state.

Figure 3:
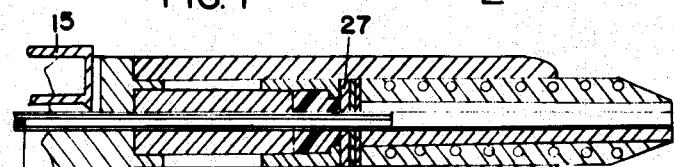
FIGURE 3 is a sectional view similar to FIGURE 1 showing how solid solder from the magazine can push aside the thermal cut-off device.
Figure 4:
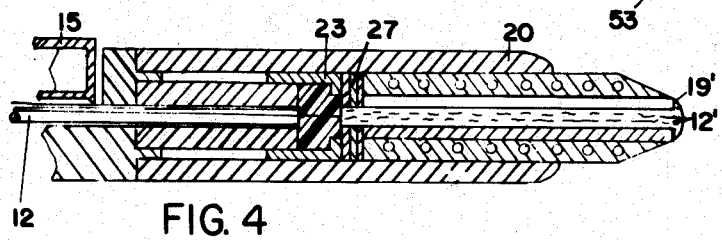
FIGURE 4 is a sectional view similar to FIGURE 1 but showing how the thermal cut-off closes when the solder in the tip melts and thus thermally insulates the solid solder from the molten solder.

It should be apparent that if the heat from elements 22 were conducted to body 16, the solid solder in orifice 13 would soon be reduced to a molten state. It is also apparent that heat from the molten solder in tip 19 will be conducted therethrough to the solid solder causing progressive melting of the solid solder until the magazine is reached. To prevent this from occurring, thermal cut-off device 23 is interposed between body 16 and tip 19. Thermal cut-off device 23 is a disc 24 of resilient material having a relatively low heat transfer coefficient at the working temperature of the tip. Such a material is silicone rubber. Disc 24 is held to body 16 by cap 25. The center of disc 24 is punctured at 26 to form a fissure aligned with apertures 18 and 21. Such fissures may be in the form of a cross, the purpose being for the disc to be resiliently deformed by the solid solder when feeder 15 is actuated. In such case, the fissure is enlarged by the solder as shown best in FIGURE 3 to effect its passage from the body to the tip. As feeder 15 is successively actuated, solid solder will eventually fill aperture 21 to the entire length of tip 19. Heat from elements 22 will eventually melt the solder in tip 19. The molten solder is, of course, much softer than the solid solder within disc 24. When the solder in disc 24 eventually melts, the resilient nature of the material of disc 24 causes the fissure to close as is shown in FIGURE 4. In this manner, disc 24 serves to thermally insulate the solid solder in body 16 from the molten solder in tip 19.

To thermally isolate body 16 from tip 19, discs 27 of glass fiber or like material are positioned between cap 25 and the tip. Such discs may be rigid, in which case a hole of substantially the same diameter as the solid solder is provided in the center of the discs. On the other hand, the discs may be laminated sheets, in which case a slit provided in the center of the discs is sufficient to permit passage of solder therethrough as shown in FIGURE 3.

It has been found that discs 27 alone may sometimes serve as a thermal cut-off without the necessity for rubber disc 24. In such case, body 16 should be made from a material having a high heat transfer coefficient. In operation, the solid solder in body 16 is connected to the molten solder in tip 19 by the solder contained within the holes in discs 27. The solder in the holes undergoes a change of state from molten to solid as the heat from the molten solder is quickly conducted through body 16 which acts as a heat sink, absorbing a great deal of heat without reaching a temperature sufficient to melt the solder therein. The remainder of the soldering iron of course cooperates with body 16 in this regard. As a result, there is no mechanical break in the continuity of the solder in the soldering iron, but a change of state occurs in the region of heat barrier 27. The conductivity of the body surrounding the solid solder is such that the temperatures never is sufficiently high to melt the solder therein.

Figure 5:
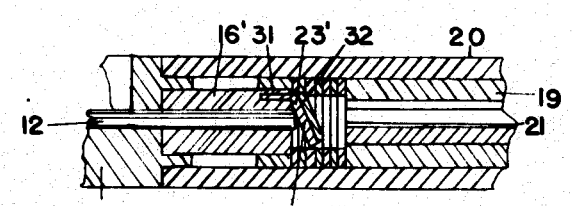
FIGURE 5 is a sectional view showing another embodiment of thermal cut-off.

Instead of a disc of resilient material, the thermal cut-off may take the form shown in FIGURE 5 at 23'. Here, a strip of spring metal 30, such as stainless steel or the like is inserted in slot 31 in body 16'. The forward face of strip 30 is covered with a thermal insulation 32. Strip 30 has a normal position shown in FIGURE 5. However, actuation of the feeder causes strip 30 to be deflected out of the path of solid solder 12 to another position such that the solid solder can enter aperture 21 in tip 19. Recalling that strip 30 is springy, it will be evident that the strip will be urged toward its normal position. However, when heat from tip 19 melts the solder in orifice 21 and the solder contacting strip 30 will move to its normal position where it will thermally insulate the solid solder in body 16' from molten solder in orifice 21.

Figure 2:
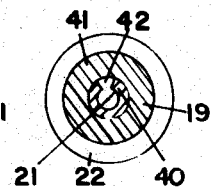
FIGURE 2 is a section taken on the line 2—2 of FIGURE 1.

Referring now to FIGURE 4, where the molten solder is designated at 12', it is believed evident that the molten solder will be readily available where an operator must rotate iron 10 to a vertical position with the working end 19' of tip 19 being above handle 11. However, were the operator to rotate iron 10 until working end 19' is downwardly directed, solder 12' would be drained from the tip by gravitational force exerted on the column of solder unless provision were made for the contrary. Provision is made by the means shown best in FIGURE 2. Tip 19 is formed of two parts: inner cylindrical member 40 and outer cylindrical member 41. One face of each member abuts discs 27, while the other face of each member constitutes the working end 19'. Heater elements 22 are contained in member 41 which may be of aluminum or like metal, which has good thermal conductivity and is not wetted by molten solder. Member 40 contains the orifice 21 therethrough, and may be of copper or like metal that is wetted by molten solder. Slot 42 in member 40 connects the exterior surface thereof with orifice 21. The purpose of this construction is two-fold: (1) a path for the flux is provided by the non-wetted portion of member 41, which path extends from face to face, and (2) capillary forces serve to maintain the column of molten solder in orifice 21 against gravitational forces. This latter factor arises because the surface of member 40 which defines orifice 21 is wetted by molten solder. By a suitable choice of orifice diameter, a column of molten solder of any desired height can be maintained. Obviously, the column height should at least equal the length of the tip from face to face. Thus, if the iron shown in FIGURE 4 were rotated until working end 19' were downwardly directed, the surface tension of molten solder 12' in cooperation with the wetted surface defining orifice 21 will maintain a column of molten solder at least the length of the tip, and no solder will be lost.

Figure 6:
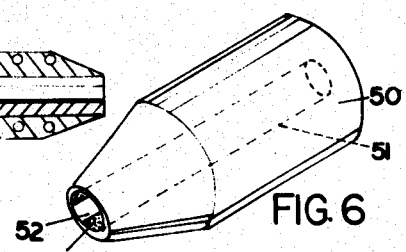
FIGURE 6 is a perspective view of another embodiment of capillary tip.

A modification of the tip previously described is shown at 50 in FIGURE 6. Tip 50 is cylindrical to fit within cover 20, and has an axially extending orifice 51. Orifice 51 is of uniform diameter. However, since tip 50 is of a material that is wetted by molten solder, a portion 52 of the surface defining the orifice is coated with a substance which is not wetted by molten solder. Surface 53 forms a wetted surface and allows the surface tension of the molten solder in orifice 51 to support the solder entirely within the orifice. Surface 52 extends the length of tip 50 and forms a path for the flux.

Figure 7:
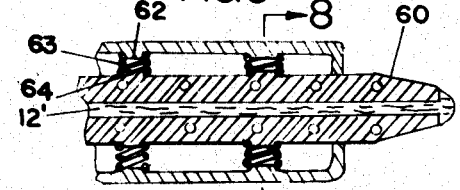
FIGURE 7 is a sectional view showing a split capillary tip and one form of erosion compensating means.
Figure 8:
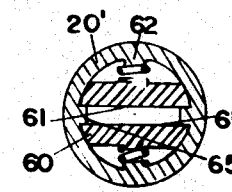
FIGURE 8 is a section taken on the line 8—8 of FIGURE 7.

It should now be apparent that it is important to maintain the spacing of the wetted walls in the tips above described in order to be assured that surface tension will hold the molten solder in the tip orifice. However, solder erodes the orifice and tends to enlarge the same after a period of use. If this were allowed to occur, the orifice might be enlarged to such a degree that the column of molten solder able to be supported would be materially reduced, even to the point where it would be less than the length of the tip. Since this is obviously an unsatisfactory condition, the invention shown in FIGURE 7 can be used. In FIGURE 7, tip 60 is made separate and of a material wetted by solder. Tip 60 has opposing surfaces 61 in order to achieve the above described capillary action. Tip 60 is housed in cover 20' from which protrude a series of aligned bosses 62. Springs 63 engaged over bosses 62 and bosses 64 resiliently urge surfaces 61 toward each other. The desired spacing between such surfaces is achieved by lugs 65 on cover 20' which protrude between the surfaces. Since lugs 65 are not wetted by solder they are not eroded. Erosion of surfaces 61 is therefore compensated by springs 64 moving the parts of tip 60 together.

Figure 10:
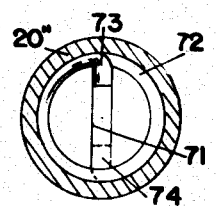
FIGURE 10 is a view taken on the line 10—10 of FIGURE 9.
Figure 9:
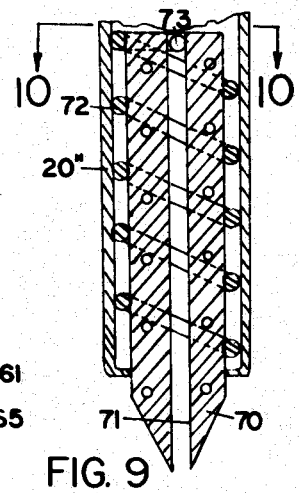
FIGURE 9 is a sectional view showing a split capillary tip and another form of erosion compensating means.

FIGURE 9 is a modification of the invention shown in FIGURE 7. Tip 70 is also in two parts, and has surfaces 71 in opposition, which surfaces are wetted by molten solder. The outside surfaces of the parts of tip 70 are curved as seen in FIGURE 10. Surrounding tip 70 is helical spring 72. Insertion of tip 70 with spring 72 places the spring in tension whereby surfaces 71 are urged together. Ends 73 and 74 on spring 72 are bent inwardly between surfaces 71 to form stops to define the minimum spacing between the surfaces. Cover 20" encloses spring 72. In operation, as surfaces 71 are eroded by molten solder, spring 72 resiliently urges the surfaces together onto ends 73 and 74.

Another embodiment of the invention is shown in FIGURES 11 through 14, and is particularly suitable for "desoldering" as well as soldering, as will be more evident from the following description. The principle involved includes the use of capillary action to support a column of molten solder against the pull of gravity and so permit an operator to orient the iron in any attitude without the molten solder running out. The capillary action arises in the embodiment shown in FIGURES 11 through 14 because of the provision of opposing wettable surfaces whose spacing is such as to cause the surface tension in the molten solder to produce the needed support. In addition, the surfaces are made selectively movable relative to each other. As a result, molten solder between the surfaces is forced out upon selective relative movement of the surfaces toward each other. While this is advantageous when it is desired to deposit solder on a work piece, it also enables this embodiment of the invention to serve as an efficient de-soldering tool.

In connection with the latter use, it is believed evident that when the surfaces are spaced and no solder is therebetween, the tip can be used to first melt the solder on a connection. The molten solder is then drawn by capillary action away from the connection and up between the surfaces. This can be accomplished regardless of the attitude of the tip and the work piece, as for example when the tip is vertically below the connection desired to be de-soldered. After the connection is de-soldered, the molten solder is removed from between the surfaces by selectively moving the surfaces relative to each other.

Figure 11:
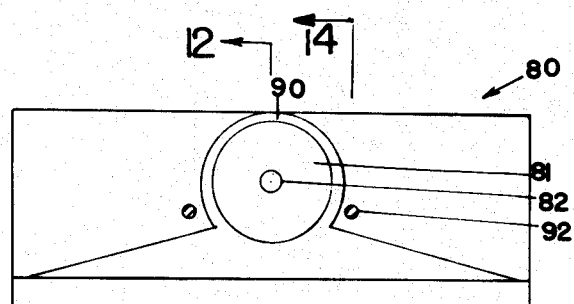
FIGURE 11 is a rear view of another embodiment of the invention.
Figure 12:
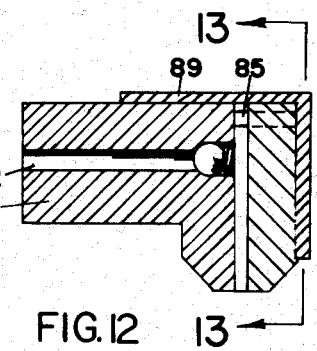
FIGURE 12 is a sectional view taken along the line 12—12 of FIGURE 11.
Figure 13:
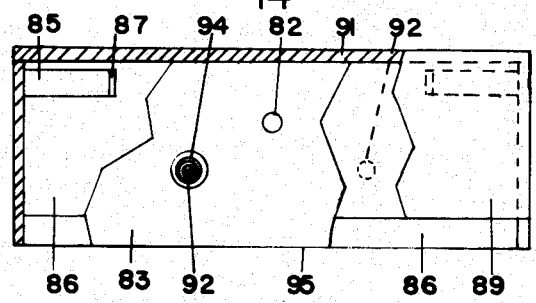
FIGURE 13 is a front view of the embodiment of FIGURE 11 with parts removed and shown in section.
Figure 14:
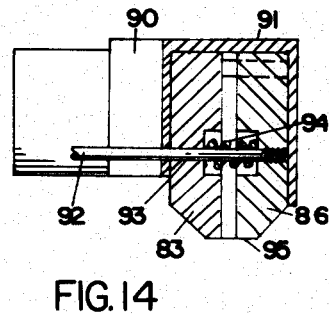
FIGURE 14 is a sectional view taken along the line 14—14 of FIGURE 11.

Referring now to FIGURE 11, tip 80 is shown with a cylindrical body 81 having an axial orifice 82 through which solder is adapted to pass. Attached to one end of body 81 is rectangular plate 83, which has surface 84 into which orifice 82 opens. Extending forwardly from surface 84 are guide lugs 85 near the top corners so that surface 88 of plate 86 is guided for movement relative to surface 84 on plate 83.

To prevent separation of plate 83 from plate 86, cover 89 is used. Cover 89 has a portion 90 which encircles body 81 and is thus securely retained thereto. Portion 91 of cover 89 is U-shaped and engages plates 83 and 86 to limit the maximum spacing between surfaces 84 and 88. In this manner, plate 86 is connected to plate 83, and plate 86 can be moved from a position where it is spaced from portion 91 and surface 88 abuts surface 84 to a position where it abuts portion 91 and surface 88 is at its maximum distance from surface 84.

To control the spacing between surfaces 84 and 88, pull rods 92 are rigidly secured to plate 86 and slideably pass through holes 93 in plate 83. Spring 94 has its ends resting against plates 83 and 86 respectively and thus biases plate 86 away from plate 83. Selective pulling of rods 92 compresses spring 94 and decreases the spacing between faces 84 and 88. Release of rods 92 causes spring 94 to move plate 86 to the position shown in FIGURE 14. Orifice 82 and surfaces 84 and 88 are wettable by molten solder. When heat is applied to tip 80 by heater elements (not shown), and work end 95 is against a soldered connection, the heat will melt the solder. Capillary action draws the molten solder from the connection up between surfaces 84 and 88, regardless of the attitude of end 95. When the connection is desoldered, the operator removes the tip from the connection. Pulling rods 92 causes the solder between surfaces 84 and 88 to be squeezed out from therebetween. Release of rods 92 places the tip in condition for de-soldering another connection.

To increase the flexibility of tip 80 and permit the same to be used as a soldering as well as a de-soldering device, check valve 95 may be inserted into orifice 82 where it connects with surface 84. In this manner, molten solder between surfaces 84 and 88 is not forced back into orifice 82 when rods 92 are pulled. However, an operator may still feed molten solder from a magazine to end 95 in the same manner as was previously described.

Figure 15:
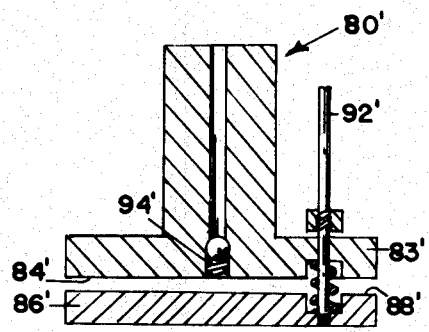
FIGURES 15 and 16 are modifications of the invention shown in FIGURE 11.
Figure 16:
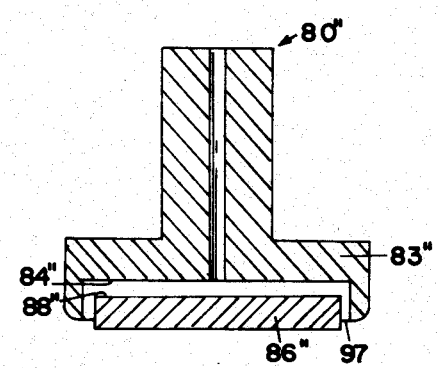

The tip shown in FIGURES 11 through 14 can be termed "linear" in that work end 95 defines a line. However, it is obvious that the length of the line is unimportant so for as the soldering and de-soldering features are concerned. Thus, end 95 could be a point or could be curved, depending upon the particular job application. It is first emphasized that when used as a soldering tip, end 95 would first heat the connection, and then the operator could either pull rod 92 to squeeze the solder onto the connection, or feed additional solder through orifice 82 without changing the spacing of the opposing surfaces. When used as a de-soldering tip, the operation is as described previously.

Where the connection desired to be de-soldered (or soldered) is circular, as for example, multiple connections on a tube socket, the embodiment of FIGURE 15 can be used. Here, tip 80' is similar to tip 80 except that molten solder moves radially toward or away from the center of circular surfaces 84' and 88'. Operation of tip 80' is similar to that of tip 80 in that the opposing surfaces are urged apart by spring 94' but can be drawn together by pulling rod 92' rigidly connected to plate 86' and slideable through plate 83'. Of course the shape of plates 84' and 86' could be whatever shape is necessary to accomplish the desired end, and could be square, rectangular, or triangular as well as circular.

Sometimes the nature of the connection is such that the connection desired is circular and lies in a plane. An example of this would be a can top. In such case, tip 80" can be used. Tip 80" is similar to tip 80' except that movable plate 86" is made with its upper surface wettable by molten solder and its lower surface not wettable. Again capillary action retains molten solder in the annular region between plate 86" and plate 83", and in the region between wetted surfaces 84" and 88". Movement of plate 86" toward 83" until edge 97 is even with the bottom of plate 86" will deposit the correct amount of solder on the connection.

What is claimed is:
1. A self-feeding soldering iron of the class described comprising: a body having an orifice through which solid solder is adapted to pass; a tip having an orifice therein aligned with the orifice in said body; actuatable feeder means for selectively feeding the solid solder through the orifice in the body into the orifice in the tip, said tip adapted to be heated to a working temperature at which the solder contained in the tip orifice is maintained in a molten state; and heat insulation means interposed between said body and said tip, said last named means including means responsive to actuation of said feeder means for effecting entry of solid solder from said body into said tip and to deactuation of said feeder means for disconnecting molten solder in the tip from solid solder in the body, whereby melting of solid solder in the latter is prevented.

2. A self-feeding soldering iron of the class described comprising: a body having an orifice through which solder is adapted to pass; a tip having an orifice therein aligned with the orifice in said body; actuatable feeder means for selectively feeding the solid solder through the orifice in the body into the orifice in the tip; means in said tip for heating the same to a working temperature at which solder contained in the tip orifice is maintained in a molten state; and thermal cut-off means interposed between the body and the tip to disconnect molten solder in the latter from solid solder in the former when said feeder means is deactuated for preventing the solid solder in the body from melting.

3. A self-feeding soldering iron of the class described comprising: a body having an orifice through which solder is adapted to pass; a tip having an orifice therein aligned with the orifice in said body; actuatable feeder means for selectively feeding the solid solder through the orifice in the body into the orifice in the tip; means in said tip for heating the same to a working temperature at which solder contained in the tip orifice is maintained in a molten state; and thermal cut-off means interposed between the body and the tip, said thermal cut-off means having an open position for effecting interconnection between the orifice in the tip and the orifice in the body and a closed position for disconnecting the apertures, said thermal cut-off being movable to closed position upon melting of the solder in the tip whereby the molten solder in the tip is mechanically separated from the solid solder in the body, said thermal cut-off means when closed serving to thermally disconnect the molten solder from the solid solder.

4. A self-feeding soldering iron of the class described comprising: a body having an orifice through which solid solder is adapted to pass; a tip having an orifice therein aligned with the orifice in said body; actuatable feeder means for selectively feeding the solid solder through the orifice in the body into the orifice in the tip; means in said tip for heating the same to a working temperature at which solder contained in the tip orifice is maintained in a molten state; and thermal cut-off means interposed between the body and the tip, said thermal cut-off means being resiliently movable to open position by movement of solid solder from the body of the tip, said cut-off means resiliently moving to a closed position upon melting of the solder in the tip for preventing conduction of heat from the molten solder in the tip to the solid solder in the body.

5. A self-feeding soldering iron of the class described comprising: a body having an orifice through which solid solder is adapted to pass; a tip having an orifice therein aligned with the orifice in said body; actuatable feeder means for selectively feeding the solid solder through the orifice in the body into the orifice in the tip; means in said tip for heating the same to a working temperature at which solder contained in the tip orifice is maintained in a molten state; and thermal cut-off means interposed between the body and the tip, said thermal cut-off means being of resilient material having a relatively low heat transfer coefficient as compared with that of said tip, said cut-off means having a fissure therein aligned with the apertures in the body and tip, said fissure having a closed position at which the cut-off means thermally insulates solid solder in the body from molten solder in the tip, said fissure being resiliently enlargeable by solid solder for effecting its passage from the body into the tip through the cut-off means upon actuation of said feed means, the resilient nature of the material of the cut-off means causing said fissure to return to closed position upon melting of the solid solder within the cut-off means.

6. A self-feeding soldering iron of the class described comprising: a body having an orifice through which solid solder is adapted to pass; a tip having an orifice therein aligned with the orifice in said body; actuatable feeder means for selectively feeding the solid solder through the orifice in the body into the orifice in the tip; means in said tip for heating the same to a working temperature at which solder contained in the tip orifice is maintained in a molten state; and thermal cut-off means interposed between the body and the tip, said thermal cut-off means being of resilient material having heat insulating properties, said cut-off means having a fissure therein aligned with the apertures in the body and tip, said fissure having a closed position separating solid solder in the body from molten solder in the tip whereby the cut-off means prevents heat from the tip and molten solder from causing melting of solid solder in the body, said fissure being resiliently enlargeable by solid solder for effecting its passage from the body into the tip through the fissure upon actuation of said feed means, the resilient nature of the material of the cut-off means causing said fissure to return to closed position upon melting of the solder within the fissure.

7. A self-feeding soldering iron of the class described comprising: a body having an orifice through which solid solder is adapted to pass; a tip having an orifice therein aligned with the orifice in said body; actuatable feeder means for selectively feeding the solid solder through the orifice in the body into the orifice in the tip; means in said tip for heating the same to a working temperature at which solder contained in the tip orifice is maintained in a molten state; and thermal cut-off means interposed between the body and the tip, said thermal cut-off means comprising a strip of material having a first position separating solid solder in the body from molten solder in the tip, and a second position interconnecting the solid solder in the body with the molten solder in the tip, said strip being resiliently urged toward said first position when moved toward said second position, said strip being contacted by solid solder upon actuation of said feed means, and moved to said second position, said strip thereafter moving to said first position upon melting of the solder in contact with said strip.

8. A tip for a soldering iron comprising a first elongated member with faces at the axial ends thereof, said first member having an axial orifice therethrough and an axial slot connecting the exterior of said first member with said orifice, and a second elongated member with faces at the axial ends thereof, said second member having an axial orifice therethrough, said first member being engaged in the orifice in said second member, the axial orifice in said first member being wettable by molten solder and the axial orifice in said second member being non-wettable by molten solder.

9. A tip for a soldering iron, said tip being elongated with faces at the axial ends thereof, spaced surface means interconnecting said faces, said surface means defining said faces, said surface means defining a portion of an aperture which extends between the faces, said surface means being wettable by molten solder to form a conduit therefor, said surface means being movable relative to each other for changing the size of the aperture, stop means for limiting the closeness of the surface means, and means for resiliently urging said surface means against said stop means.

10. A tip in accordance with claim 9 wherein said resilient means is a helical spring wound around said tip, the ends of the spring being adjacent said faces and engaged between the surface means for forming the stop means.

11. A tip for a soldering iron comprising first means defining an orifice through which solder is adapted to pass, said first means having a surface thereon wettable by molten solder, second means having a surface thereon wettable by molten solder, means mounting said first and second means so that said surfaces are opposite and movable relative to each other, means to heat said first and second means to a temperature at which solid solder is reduced to a molten state, means to limit the spacing between said surfaces to a distance such that capillary action will support all of the molten solder between said surfaces, and means to selectively move said surfaces relative to each other whereby the spacing between said surfaces can be decreased to force molten solder from therebetween.

12. A tip for a soldering iron comprising first means defining an orifice through which solder is adapted to pass, said first means having a surface thereon wettable by molten solder, second means having a surface thereon wettable by molten solder, means mounting said first and second means so that said surfaces are opposite and movable relative to each other, means to heat said first and second means to a temperature at which solid solder is reduced to a molten state, a work engaging surface on each of said first and second means connecting with its wettable surface and means to selectively move said wettable surfaces relative to each other for changing the spacing therebetween, the work engaging surfaces adapted to contact a soldered workpiece and melt the solder thereon whereby the melted solder from the work-piece is drawn between the wettable surfaces by capillary action, the spacing of said wettable surfaces determining the amount of melted solder taken from the work-piece.

13. A de-soldering tool comprising first surface means wettable by molten solder, second surface means wettable by molten solder, means mounting the surface means for relative movement, said first and second means adapted to be heated to a working temperature at which solid solder in contact with the surface means would be reduced to a molten state, and means to selectively vary the spacing between said first and second surface means.

14. A de-soldering tool comprising opposing surface means which are wettable by molten solder, said surface means being relatively movable to vary the spacing therebetween, and means to selectively vary the spacing so that molten solder can be drawn up between the wetted surface means by capillary action when the spacing is made small and molten solder between the wetted surfaces can be removed therefrom when the surface means abut.

15. A self-feeding soldering iron of the class described comprising: a body having an orifice through which solid solder is adapted to pass; a tip having an orifice therein aligned with the orifice in said body; actuatable feeder means for selectively feeding the solid solder through the orifice in the body into the orifice in the tip; means in said tip for heating the same to a working temperature at which solder contained in the tip orifice is maintained in a molten state; and thermal cut-off means interposed between the body and the tip, said thermal cut-off means being responsive to melting of solder in the tip to prevent the transfer of heat therefrom to solid solder in the body when said feeder means is deactuated for preventing heat from the molten solder in the tip from melting the solid solder in the body.

16. A self-feeding soldering iron of the class described comprising: a body having an orifice through which solid solder is adapted to pass; a tip having an orifice therein aligned with the orifice in said body; actuatable feeder means for selectively feeding the solid solder through the orifice in the body into the orifice in the tip; means in said tip for heating the same to a working temperature at which solder contained in the tip orifice is maintained in a molten state; and means responsive to deactuation of said feeder when solder in the tip is molten to thermally disconnect the latter from solid solder in the body for preventing heat from the tip from melting the solid solder in the body.

17. A self-feeding soldering iron of the class described comprising: a body having an orifice through which solid solder is adapted to pass; a tip having an orifice therein aligned with the orifice in said body; actuatable feeder means for selectively feeding the solid solder through the orifice in the body into the orifice in the tip; means in said tip for heating the same to a working temperature at which solder contained in the tip orifice is maintained in a molten state; and movable thermal cut-off means interposed between the body and the tip, said thermal cut-off means having an inoperative position for effecting heat transfer from said tip to solid solder in the body and an operative position for preventing heat transfer from said tip to solid solder in the body, means biasing said cut-off means toward operative position, actuation of said feeder means causing movement of solid solder from said body toward said tip to maintain said thermal cut-off means at inoperative position, deactuation of said feeder means causing the means biasing said cut-off means to move the same to operative position.

References Cited in the file of this patent

UNITED STATES PATENTS

| | | |
|---|---|---|
| 872,229 | Gifford | Nov. 26, 1907 |
| 1,449,517 | Lame | Mar. 27, 1923 |
| 1,457,508 | Dellman | June 5, 1923 |
| 2,462,131 | Rustin | Feb. 22, 1949 |
| 2,780,712 | Thomas | Feb. 5, 1957 |
| 2,810,168 | Nyborg | Oct. 22, 1957 |